C. VON HOFE.
DISTANCE MEASURING INSTRUMENT.
APPLICATION FILED JAN. 6, 1913.
1,247,185.
Patented Nov. 20, 1917.
2 SHEETS—SHEET 1.
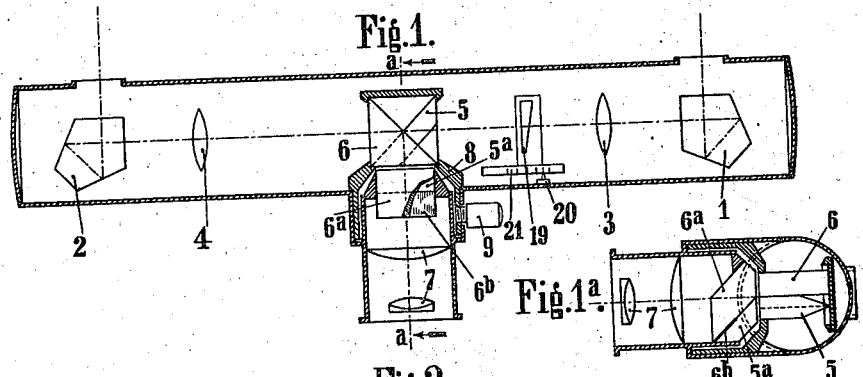
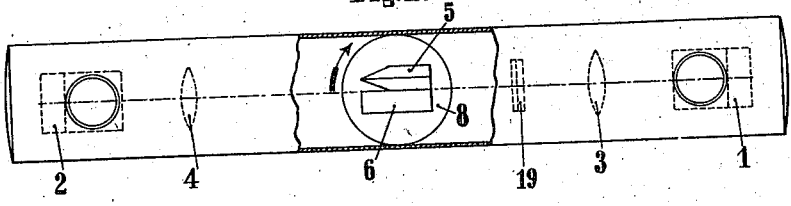
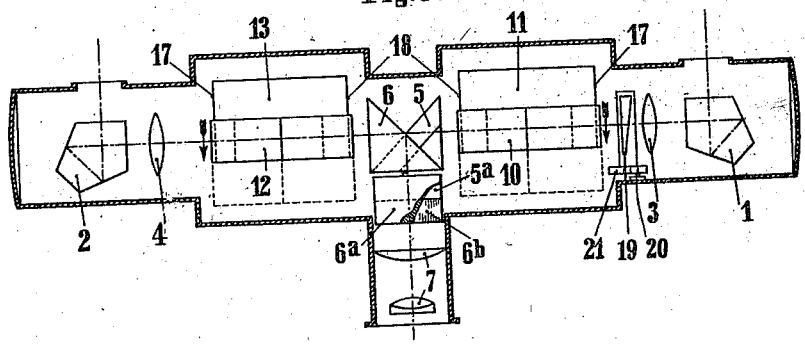
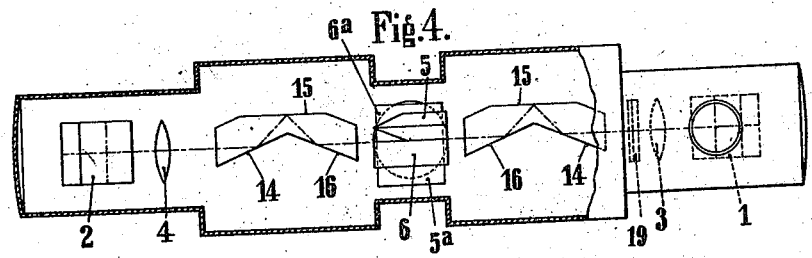

C. VON HOFE.
DISTANCE MEASURING INSTRUMENT.
APPLICATION FILED JAN. 6, 1913.

1,247,185.

Patented Nov. 20, 1917.
2 SHEETS—SHEET 2.

Inventor
Christian von Hofe
by
Brown, Raegener, Moody & Matty
attys.

UNITED STATES PATENT OFFICE.

CHRISTIAN VON HOFE, OF ZEHLENDORF, GERMANY, ASSIGNOR TO FIRM OF OPTISCHE ANSTALT C. P. GOERZ AKTIENGESELLSCHAFT, OF FRIEDENAU, NEAR BERLIN, GERMANY.

DISTANCE-MEASURING INSTRUMENT.

1,247,185.      Specification of Letters Patent.      Patented Nov. 20, 1917.

Application filed January 6, 1913. Serial No. 740,338.

*To all whom it may concern:*

Be it known that I, CHRISTIAN VON HOFE, citizen of the German Empire, and resident of Zehlendorf, near Berlin, Germany, have invented certain new and useful Improvements in Distance-Measuring Instruments, of which the following is a specification.

The invention relates to a base line distance meter, having in the image field a dividing line, on both sides of which appear images of the distant objects aimed at which meet at the dividing line. The object of the invention is to enable the observer to reverse either of the images on opposite sides of the dividing line or only one single image on one side of the dividing line or on the other.

By reversing each of the images an inversion telemeter wherein top points of distant objects are brought to coincidence is charged to an inversion telemeter where bottom points of the objects contact with each other in the dividing line and vice versa; by reversing one single image an inversion telemeter is changed into a coincidence telemeter and vice versa.

The object of the invention is secured by providing the instrument with reflectors which can be shifted in space, so that a reflector belonging to one side of the instrument can be associated with the other side of the instrument, or that they can be placed in or out of the path of rays at will. Two forms of construction embodying the invention are shown diagrammatically in the accompanying drawings, in which:—

Figure 1 is a longitudinal section and Fig. 2 an elevation; partly in section at right angles to Fig. 1, of an inversion distance meter, in which the positions of the reflector surfaces, which are inclined to each other and project the rays from the end reflectors into the ocular, can be changed with respect to one another by turning their holder about the ocular axis.

Fig. 1ª is a section on line *a—a* of Fig. 1.

Figs. 3 and 4 are similar views in section of an instrument provided with prism bodies with an uneven number of reflectors, which can be placed in the path of the rays between the objectives and the image uniting system of the instrument.

Figure 5:
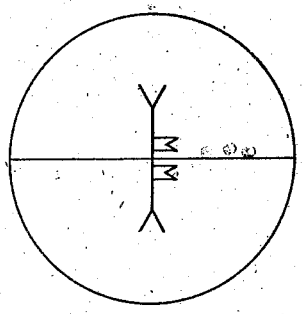
Figure 6:
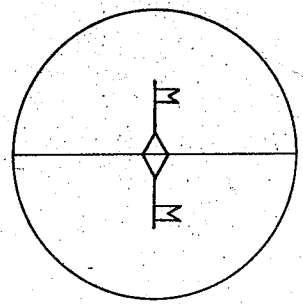
Figure 7:
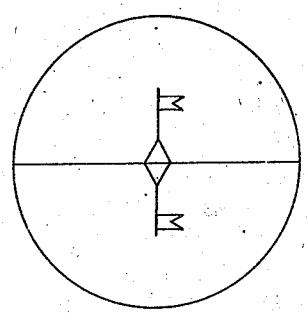
Figure 8:
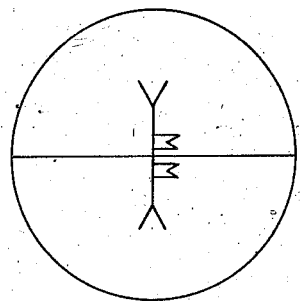
Figure 9:
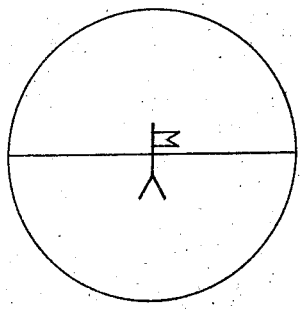
Figure 10:
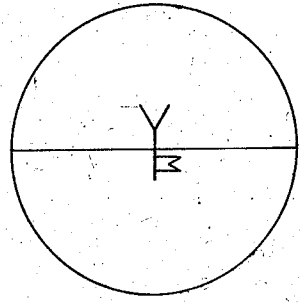

Figs. 5 and 6 illustrate the change of images obtainable with the embodiment of the instrument shown in Figs. 1 and 2. Fig. 7 shows the image resulting from the position of elements shown in full lines in said Figs. 3 and 4. Fig. 8 shows the image with the position of the elements shown in dotted lines in Fig. 3. Fig. 9 shows the image resulting on the change of prism 10 on the right hand side of the instrument by glass block 11 and Fig. 10 shows the image resulting if prism 12 on the left hand side of Fig. 3 is substituted by the glass block 13 whereas on the right side prism 10 stands inserted in the path of the rays.

In the instrument shown in Figs. 1 and 2, 1, 2 designate the usual penta prisms forming the reflectors at the ends of the instrument. The objectives are designated 3, 4. The image uniting system comprises two crossed prisms 5, 6 of which 5 presents a roof shaped surface to the objective associated therewith. 7 is the ocular. The image uniting members 5, 6 are mounted in a revoluble tubular holder 8, which can be turned about its axis by means of a handle 9. By turning the holder 8, the prisms 5, 6 of the image uniting system can be turned at will to face either of the end reflectors. In front of prisms 5, 6 there is a compound prism firmly mounted consisting of the rhombohedral prism 6ª and the triangular prism 5ª the two prisms being provided with a reflecting layer 6ᵇ in their contacting surface. 19 is an adjustable wedge shaped prism connected with a pointer 20 sliding on a scale 21. The edge of the reflecting layer 6ᵇ forms the image dividing line in the field of view and the wedge shaped prism 19 allows the adjustment of the instrument on distant objects in the usual manner so that images of the objects aimed at appear coincident above and below the dividing line.

With the image uniting system shown, the image appears upright in one half and upside down in the other half, so that the characters of the images are interchanged by turning the holder 8. It is thus possible to cause either the upwardly directed or the downwardly directed parts of the partial images of the observed object to meet at the dividing line, which greatly assists in obtaining accuracy of measurement.

In the form of construction shown in Figs. 3 and 4, 1, 2 are the penta prisms acting as end reflectors, 3, 4 are the objectives and 5, 6 the prisms of the image uniting system. The prisms 5, 6 in this case, however, are fixed as usual as well as the compound prism consisting of the rhombohedral prism 6ª and the triangular prism having again the reflecting layer 6ᵇ in their contact surface. The ocular is designated 7. Arranged between the objectives 3, 4 and the image uniting members 5, 6 are glass bodies 10, 11 and 12, 13, the bodies 10, 12 being in the form of prisms each having three reflecting surfaces 14, 15, 16. When the glass bodies 10 and 12 are placed in the path of the rays in the two halves of the instrument, the rays from the objectives 3, 4 are thrice reflected by the surfaces 14, 15, 16 before they reach the image uniting members 5, 6, so that by placing the prisms 10, 12 in the path of the rays, the images in both halves are inverted as compared with the case in which the glass bodies 11, 13 having plane parallel surfaces 17, 18 are inserted. If only one prism 10 or 12 is replaced by the corresponding glass body 11 or 13 respectively then only an inversion of images on one side of the dividing line takes place so that the inversion telemeter is changed to a coincidence telemeter, wherein partial images appear on opposite sides of the dividing line forming complete images on adjustment to coincidence.

Of course only one set of movable prisms 10, 11 or 12, 13 on one side of the instrument may be provided. In this case however the instrument can only in one single manner be used as inversion telemeter either as an instrument where images of top points of objects contact with each other in the dividing line or as an instrument with contacting bottom points.

The dimensions of the prisms 10, 12 and glass bodies 11, 13 are such that the position of the image remains the same whether the prisms 10, 12 or the glass bodies 11, 13 are placed in the path of the rays. The adjustable wedge shaped prism is again designated 19, the pointer 20 and the scale 21.

The glass bodies 11, 13 may be dispensed with, provided the dimensions and the quality of the glass of which the prisms 10, 12 are made, produce an extension of the ray path, by deviation, equivalent to the extension of the width of intersection of the rays, effected by the passage of the rays through the glass bodies.

What I claim is:—

1. In a base line distance meter provided with crossing reflecting surfaces deviating the rays from the end reflectors of the instrument into one direction, means for adjusting said reflectors so as to be interchanged with respect to one another, so that each of them may be alternatively associated with either of the end reflectors.

2. In a base line distance meter provided with crossing reflecting surfaces deviating the rays from the end reflectors of the instrument into one direction a rotatable carrier for said reflectors allowing by its rotation to alternatively associate each of said reflectors with either of the end reflectors.

In testimony whereof I have signed this specification in the presence of two subscribing witnesses.

CHRISTIAN von HOFE.

Witnesses:
 WOLDEMAR HAUPT,
 HENRY HASPER.